(12) United States Patent
Aljabari et al.

(10) Patent No.: US 10,222,271 B2
(45) Date of Patent: *Mar. 5, 2019

(54) SYSTEM FOR DETERMINING AMBIENT TEMPERATURE

(71) Applicant: Honeywell International Inc., Morris Plains, NJ (US)

(72) Inventors: Mohammad Aljabari, Brooklyn Park, MN (US); Michael Lunacek, Rogers, MN (US); Jeff Tauer, Jordan, MN (US)

(73) Assignee: Ademco Inc., Golden Valley, MN (US)

( * ) Notice: Subject to any disclaimer, the term of this patent is extended or adjusted under 35 U.S.C. 154(b) by 204 days.

This patent is subject to a terminal disclaimer.

(21) Appl. No.: 15/150,116

(22) Filed: May 9, 2016

(65) Prior Publication Data

US 2016/0252268 A1 Sep. 1, 2016

Related U.S. Application Data

(63) Continuation of application No. 13/447,138, filed on Apr. 13, 2012, now Pat. No. 9,335,769, which is a
(Continued)

(51) Int. Cl.
*G01K 3/14* (2006.01)
*G01K 1/20* (2006.01)
(Continued)

(52) U.S. Cl.
CPC ............... *G01K 3/14* (2013.01); *F24F 11/30* (2018.01); *F24F 11/62* (2018.01); *G01K 1/00* (2013.01);
(Continued)

(58) Field of Classification Search
CPC .. F24F 11/62; F24F 11/63; F24F 11/30; F24F 11/006; F24F 2110/12; F24F 2110/10;
(Continued)

(56) References Cited

U.S. PATENT DOCUMENTS 3,948,441 A 4/1976 Perkins et al.
3,988,708 A 10/1976 Thorsteinsson et al.
(Continued)

FOREIGN PATENT DOCUMENTS

DE 19728803 8/1999
EP 0803788 7/2001

OTHER PUBLICATIONS

Office Action in Canadian Application No. 2,708,803 dated Jul. 27, 2017.
(Continued)

*Primary Examiner* — Toan Le
(74) *Attorney, Agent, or Firm* — Shumaker & Sieffert, P.A.

(57) ABSTRACT

A mechanism for indicating ambient temperature of an enclosure from temperatures determined within the enclosure. The temperatures may be obtained from two or more sensors at each of two or more locations within the enclosure. The enclosure may include heat generating components such as electronics. The enclosure may also incorporate one or more dynamic components that emanate sudden amounts of heat. The present mechanism compensates for such heat sources with a compensating scheme.

19 Claims, 14 Drawing Sheets

Related U.S. Application Data continuation-in-part of application No. 11/950,394, filed on Dec. 4, 2007, now Pat. No. 8,280,673.

(51) Int. Cl.

| | | |
|---|---|---|
| *G05D 23/19* | (2006.01) | |
| *G01K 1/00* | (2006.01) | |
| *G01K 7/42* | (2006.01) | |
| *G01K 1/02* | (2006.01) | |
| *F24F 11/30* | (2018.01) | |
| *F24F 11/62* | (2018.01) | |
| *F24F 110/10* | (2018.01) | |
| *F24F 110/12* | (2018.01) | |
| *F24F 140/50* | (2018.01) | |
| *F24F 130/30* | (2018.01) | |
| *F24F 11/63* | (2018.01) | |

(52) U.S. Cl.
CPC ............. *G01K 1/026* (2013.01); *G01K 1/20* (2013.01); *G01K 7/42* (2013.01); *G01K 7/427* (2013.01); *G05D 23/1917* (2013.01); *G05D 23/1932* (2013.01); *F24F 11/63* (2018.01); *F24F 2110/10* (2018.01); *F24F 2110/12* (2018.01); *F24F 2130/30* (2018.01); *F24F 2140/50* (2018.01)

(58) Field of Classification Search
CPC .... F24F 2140/50; F24F 2130/30; G01K 1/00; G01K 1/026; G01K 1/20; G01K 13/14; G01K 7/42; G01K 7/427; G01K 3/14; G05D 23/1932

See application file for complete search history.

(56) References Cited

U.S. PATENT DOCUMENTS

| | | |
|---|---|---|
| 4,001,752 A | 1/1977 | Hazleton |
| 4,008,454 A | 2/1977 | Bowling |
| 4,075,594 A | 2/1978 | Tomoyoshi |
| 4,095,740 A | 6/1978 | Wirth |
| 4,154,397 A | 5/1979 | Carlson |
| 4,172,555 A | 10/1979 | Levine |
| 4,181,957 A | 1/1980 | Pinckaers |
| 4,240,077 A | 12/1980 | Hughes et al. |
| 4,241,872 A | 12/1980 | Frankenberg |
| 4,248,375 A | 2/1981 | Whitney |
| 4,283,701 A | 8/1981 | Ryckman, Jr. |
| 4,319,711 A | 3/1982 | Barker et al. |
| 4,332,352 A | 6/1982 | Jaeger |
| 4,341,345 A | 7/1982 | Hammer et al. |
| 4,358,667 A | 11/1982 | Johnson et al. |
| 4,373,664 A | 2/1983 | Barker et al. |
| 4,387,763 A | 6/1983 | Benton |
| 4,399,428 A | 8/1983 | Hughes et al. |
| 4,448,033 A | 5/1984 | Briccetti |
| 4,460,125 A | 7/1984 | Barker et al. |
| 4,480,174 A | 10/1984 | Hummel |
| 4,577,977 A | 3/1986 | Pejsa |
| 4,606,401 A | 8/1986 | Levine et al. |
| 4,632,177 A | 12/1986 | Beckey |
| 4,641,012 A | 2/1987 | Roberts |
| 4,695,942 A | 9/1987 | Levine et al. |
| 4,703,298 A | 10/1987 | Gerson |
| 4,730,941 A | 3/1988 | Levine et al. |
| 4,741,476 A | 5/1988 | Russo et al. |
| 4,746,785 A | 5/1988 | De Longhi |
| 4,776,514 A | 10/1988 | Johnstone et al. |
| 4,793,553 A | 12/1988 | Berman |
| 4,829,548 A | 5/1989 | Russo et al. |
| RE32,960 E | 6/1989 | Levine |
| 4,814,458 A | 6/1989 | Levine et al. |
| 4,837,731 A | 6/1989 | Levine et al. |
| 4,841,458 A | 6/1989 | Levine et al. |
| 4,864,513 A | 9/1989 | Levine et al. |
| 4,910,966 A | 3/1990 | Levine et al. |
| 4,916,912 A | 4/1990 | Levine et al. |
| 4,951,473 A | 8/1990 | Levine et al. |
| 4,974,417 A | 12/1990 | Levine et al. |
| 4,974,418 A | 12/1990 | Levine et al. |
| 5,001,656 A | 3/1991 | Zimmerman et al. |
| 5,025,242 A | 6/1991 | Holtkamp et al. |
| 5,025,984 A | 6/1991 | Bird et al. |
| 5,039,010 A | 8/1991 | Juntunen |
| 5,088,806 A | 2/1992 | McCartney et al. |
| 5,105,366 A | 4/1992 | Beckey |
| 5,170,752 A | 12/1992 | Binversie et al. |
| 5,197,668 A | 3/1993 | Ratz et al. |
| 5,199,637 A | 4/1993 | Adams |
| 5,203,497 A | 4/1993 | Ratz et al. |
| 5,219,119 A | 6/1993 | Kasper et al. |
| 5,269,458 A | 12/1993 | Sol |
| 5,270,952 A | 12/1993 | Adams et al. |
| 5,410,230 A | 4/1995 | Bessier et al. |
| 5,416,728 A | 5/1995 | Ruzewicz et al. |
| 5,453,944 A | 9/1995 | Baumeol |
| 5,461,372 A | 10/1995 | Busak et al. |
| 5,524,444 A | 6/1996 | Gromala et al. |
| 5,533,349 A | 7/1996 | Gromala et al. |
| 5,542,279 A | 8/1996 | Erdman et al. |
| 5,542,285 A | 8/1996 | Merilainen et al. |
| 5,552,956 A | 9/1996 | Paquarette et al. |
| 5,555,927 A | 9/1996 | Shah |
| 5,574,421 A | 11/1996 | Hickling |
| 5,615,829 A | 4/1997 | Porter |
| 5,659,285 A | 8/1997 | Takeda |
| 5,735,604 A | 4/1998 | Ewals et al. |
| 5,758,407 A | 6/1998 | Hickling |
| 5,795,112 A | 8/1998 | Senda |
| 5,803,357 A | 9/1998 | Lakin |
| 5,812,061 A | 9/1998 | Simons |
| 5,839,654 A | 11/1998 | Weber |
| 5,950,709 A | 9/1999 | Krueger et al. |
| 6,044,808 A | 4/2000 | Hollis |
| 6,088,661 A | 7/2000 | Poubion |
| 6,169,937 B1 | 1/2001 | Peterson |
| 6,189,798 B1 | 2/2001 | Sano et al. |
| 6,208,905 B1 | 3/2001 | Giddings et al. |
| 6,225,907 B1 | 5/2001 | Derryberry et al. |
| 6,460,774 B2 | 10/2002 | Sumida et al. |
| 6,487,457 B1 | 11/2002 | Hull et al. |
| 6,502,238 B1 | 12/2002 | Pavan et al. |
| 6,505,781 B2 | 1/2003 | Altman |
| 6,536,678 B2 | 3/2003 | Pouchak |
| 6,595,430 B1 | 7/2003 | Shah |
| 6,598,056 B1 | 7/2003 | Hull et al. |
| 6,621,507 B1 | 9/2003 | Shah |
| 6,644,849 B1 | 11/2003 | Conner |
| 6,647,302 B2 | 11/2003 | Pouchak |
| 6,694,927 B1 | 2/2004 | Pouchak et al. |
| 6,695,471 B2 | 2/2004 | Hashimoto et al. |
| 6,728,600 B1 | 4/2004 | Contaido et al. |
| 6,804,169 B2 | 10/2004 | Addy et al. |
| 6,850,856 B1 | 2/2005 | Gauthier et al. |
| 6,851,621 B1 | 2/2005 | Wacker et al. |
| 6,938,432 B2 | 9/2005 | Enomoto |
| 6,974,251 B2 | 12/2005 | DeRonne et al. |
| 7,044,637 B2 | 5/2006 | O'neill et al. |
| 7,281,812 B2 | 10/2007 | Kim |
| 7,364,353 B2 | 4/2008 | Kolk |
| 7,387,437 B2 | 6/2008 | Brown et al. |
| 7,395,173 B2 | 7/2008 | Kautz et al. |
| 7,406,397 B2 | 7/2008 | Hyde et al. |
| 7,514,904 B2 | 4/2009 | Marchand et al. |
| 7,656,302 B2 | 2/2010 | Lang |
| 7,784,705 B2 | 8/2010 | Kasper et al. |
| 8,280,673 B2 | 10/2012 | Aljabari |
| 8,949,066 B2 | 2/2015 | Aljabari |
| 8,954,288 B2 | 2/2015 | Aljabari |
| 9,326,323 B2 | 4/2016 | Ajabari |
| 9,335,769 B2 * | 5/2016 | Aljabari ............ G05D 23/1932 |
| 2005/0209813 A1 | 9/2005 | Kautz et al. |
| 2007/0295713 A1 | 12/2007 | Carlton-Foss |

(56) References Cited

U.S. PATENT DOCUMENTS

| | | |
|---|---|---|
| 2012/0181011 A1 | 7/2012 | Aljabari |
| 2013/0099008 A1 | 4/2013 | Aljabari et al. |
| 2013/0204442 A1* | 8/2013 | Modi .................. F24F 11/0009 700/278 |
| 2013/0338839 A1 | 12/2013 | Rogers et al. |
| 2015/0129577 A1 | 5/2015 | Aljabari |

OTHER PUBLICATIONS

Prior Art Heat Compensation Techniques for Thermostats That Existed Prior to Feb. 27, 2006, 1 page, created on Oct. 2, 2006.

"T4700A&B Digital Chronotherm Line Voltage Thermostat," Honeywell Engineering Specification No. ES26160, 23 pages, Released Jun. 1999.

Abstract of Modeling and Managing Thermal Profiles of Rack-Mounted Servers with ThermoStat, 2 pages, Dec. 8, 2012.

Bibbero, "Estimating Temperature Rise in Electronic Equipment Cases," Proceedings of the IRE, vol. 39, Issue 5, pp. 504-508, May 1951.

Choi et al., "Modeling and Managing Thermal Profiles of Rack-Mounted Servers with ThermoStat," IEEE, 13th International Symposium on High Performance Computer Architecture, HPCA 2007, pp. 205-215, Feb. 10-14, 2007.

International Search Report for Corresponding Application No. EP 08856563 dated Jun. 4, 2014.

John et al., Advancement of Multifunctional Support Structure Technologies (AMFSST) Therminic, pp. 98-103, Sep. 2007.

List of Abstracts of IEEE 13th International Symposium on High Performance Computer Architecture, 2007.

McNamara, "Thermal Sensing Requires System-Level Design," Power Electronics Technology, pp. 28-35, May 2007.

Response to Canadian Office Action dated May 29, 2018, from counterpart Canadian application No. 2,708,036, filed Nov. 16, 2018, 9 pp.

* cited by examiner

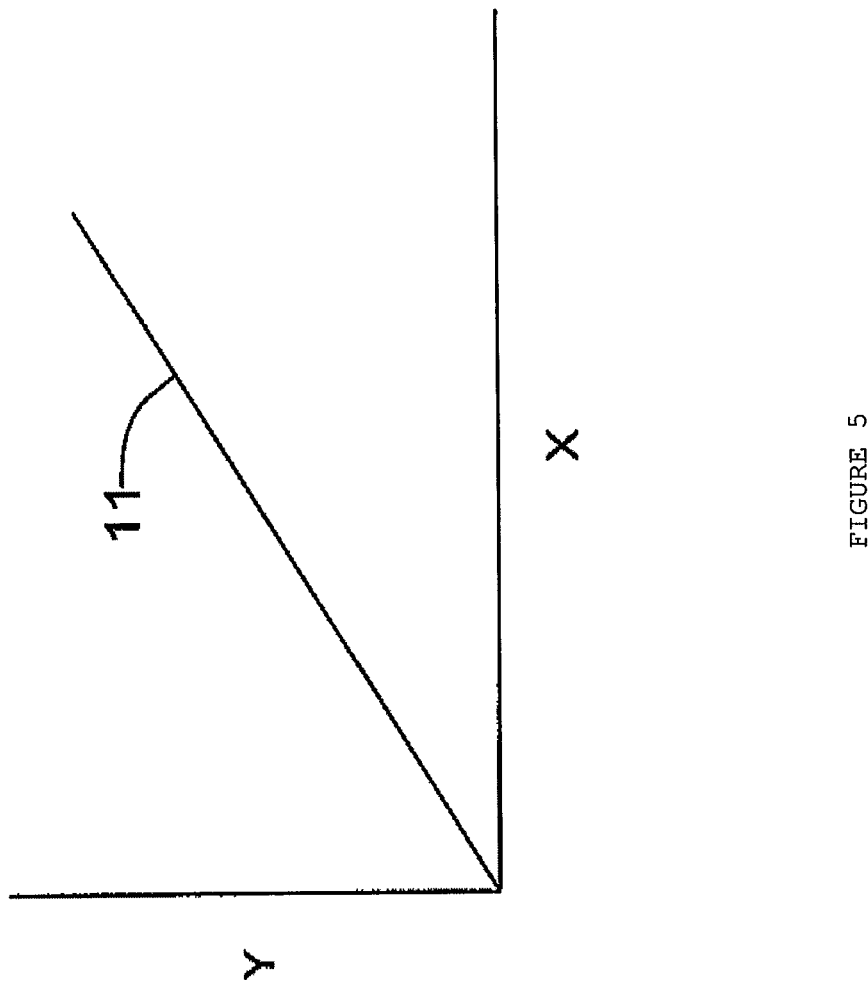

| | Air Flow 1 | | | | Adjusted Data for $T_a = 70°$ | axis 1 $T_1-T_a$ | axis 2 $T_2-T_a$ | axis 3 $T_3-T_a$ | Data Point |
|---|---|---|---|---|---|---|---|---|---|
| | axis 1 $T_1$ | axis 2 $T_2$ | axis 3 $T_3$ | | | | | | |
| | 85 | 78 | 74 | Power 1 | ⇒ | 15 | 8 | 4 | A |
| 21 | 88 | 79 | 76 | Power 2 | | 18 | 9 | 6 | B |
| | 89 | 84 | 79 | Power 3 | | 19 | 14 | 9 | C |
| | Air Flow 2 | | | | | | | | |
| | $T_1$ | $T_2$ | $T_3$ | | | | | | |
| | 80 | 76 | 71 | Power 1 | ⇒ | 10 | 6 | 1 | D |
| 22 | 84 | 78 | 75 | Power 2 | | 14 | 8 | 5 | E |
| | 86 | 81 | 77 | Power 3 | | 16 | 11 | 7 | F |
| | Air Flow 3 | | | | | | | | |
| | $T_1$ | $T_2$ | $T_3$ | | | | | | |
| | 91 | 80 | 76 | Power 1 | ⇒ | 21 | 10 | 6 | G |
| 23 | 93 | 84 | 78 | Power 2 | | 23 | 14 | 8 | H |
| | 95 | 88 | 82 | Power 3 | | 25 | 18 | 12 | I |

FIGURE 8

SYSTEM FOR DETERMINING AMBIENT TEMPERATURE

The present application is a continuation of U.S. patent application Ser. No. 13/447,138, filed Apr. 13, 2012, now U.S. Pat. No. 9,335,769, which in turn is a continuation-in-part of U.S. patent application Ser. No. 11/950,394, filed Dec. 4, 2007, now U.S. Pat. No. 8,280,673, and entitled "System for Determining Ambient Temperature". U.S. patent application Ser. No. 13/447,138, filed Apr. 13, 2012, is hereby incorporated by reference. U.S. patent application Ser. No. 11/950,394, filed Dec. 04, 2007 is hereby incorporated by reference.

BACKGROUND

The present disclosure pertains to temperature sensing and particularly to indirect determination of certain temperatures.

SUMMARY

The disclosure reveals a mechanism for indicating an ambient temperature about an enclosure containing a device, from determined temperatures within the enclosure. The mechanism may further compensate for dynamically varying heat sources such as, for example, LCD backlighting for a thermostat. Other examples of dynamically varying heat sources may include RF, LED's, relays, batteries, and so on.

BRIEF DESCRIPTION OF THE DRAWING

FIG. 5 is a diagram of a straight line fitted to data from sensors in the enclosure plotted on a two-coordinate graph for determining ambient temperature from a fitted equation;

FIG. 8 a table of data from sensors for three locations in the enclosure for various air flows and power consumption levels in the equipment in the enclosure;

DESCRIPTION

The present system may be one for determining ambient temperature having compensation for dynamic thermal sources. Measuring ambient temperatures may be a fundamental task in a thermostat. Many thermostats may require LCD displays as part of a user interface. These displays may require a backlight or other display lighting technology. The backlight may generate significant heat which can impair the thermostat's ability to sense room temperature accurately. Furthermore, if the backlight intensity is dynamic (i.e., adjustable by the user, having varying ambient light conditions, or being on a schedule), the heat contribution by the backlight may likewise be dynamic. There may be other heat generating elements in the thermostat; however, the dynamic backlight heat can make it difficult to infer the proper room or ambient temperature from temperature sensing alone. The approach may also be of concern relative various kinds of dynamic heat sources, such as other display lighting schemes such as LEDs.

Thermal compensation for internal self heating in the thermostat may be calculated via a continuous linear or non-linear equation. The equation may have multiple terms, one of which is the backlight level. The backlight level may be correlated to a predetermined constant contribution factor. The equation may provide an acceptable solution for static heat rise conditions. However, in a dynamic backlight condition, there may be a delay in temperature change due to a change in backlight. Since such temperature does not necessarily change instantaneously, the compensation mechanism should account for delay to prevent an instantaneous error in the temperature calculation upon backlight change.

Figure 1:
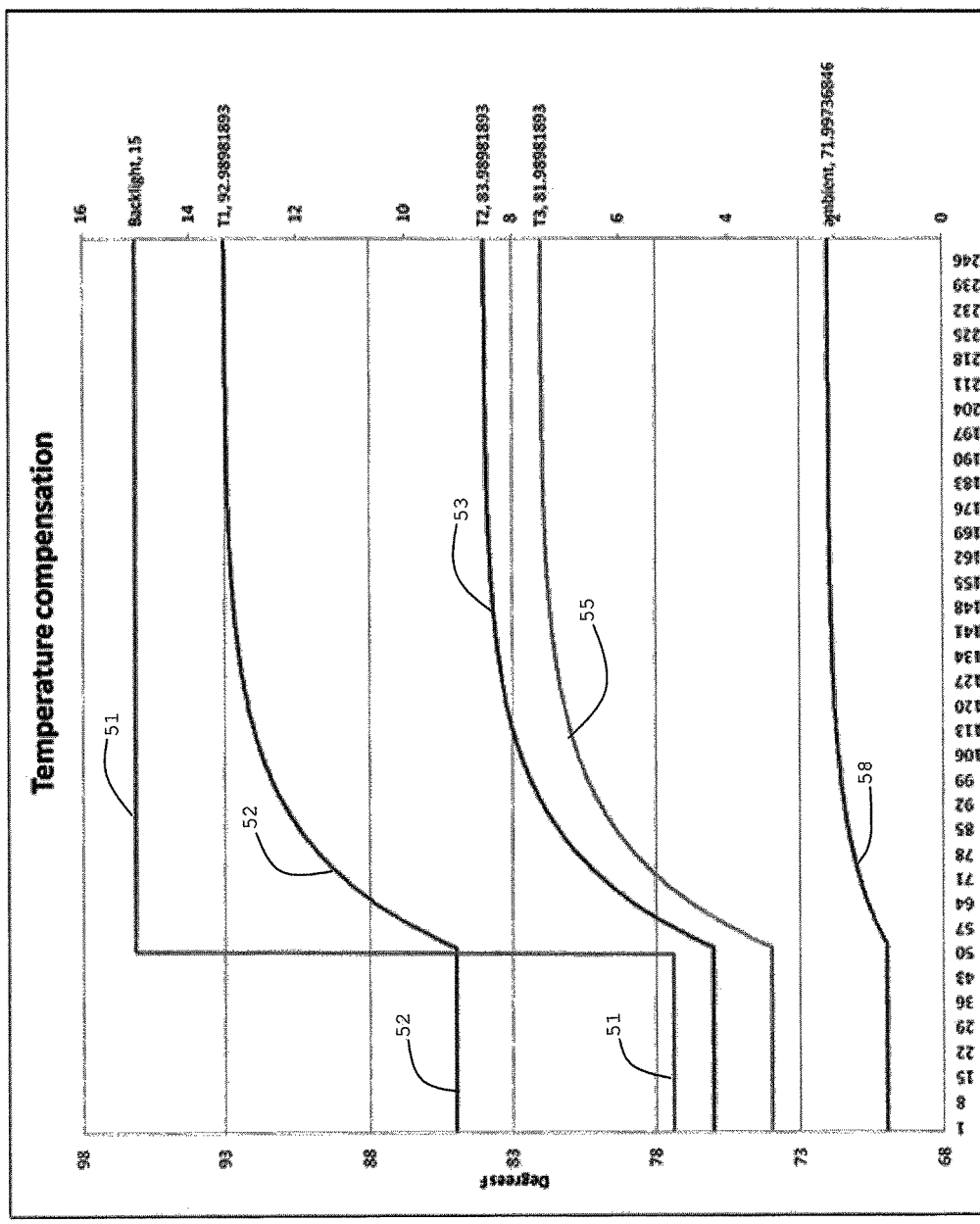
FIGS. 1-3 are graphs of various ambient temperature determination scenarios involving backlight activity of the enclosure.

To illustrate the issue, without backlight compensation, calculated ambient temperature may shift at different backlight level, as shown by a diagram in FIG. 1. Line 51 shows the backlight which may be off from 1 to 50 units of time at a magnitude of 5 and then is turned at the 50th unit of time and jump up to a magnitude of 15, where a rapid amount of heat is dissipated causing the temperatures detected by $T_1$ sensor 12, $T_2$ sensor 13 and $T_3$ sensor 18 to rise, as indicated by curves 51, 52 and 58, respectively. Sensors 12, 13 and 18 are further discussed below. The ambient temperature indication by curve 55 shows an increase due to the sudden increase of heat from the backlight. The sudden increase of heat may be instead from another kind of heat generating component within the enclosure. The enclosure may be that of a thermostat.

Figure 2:
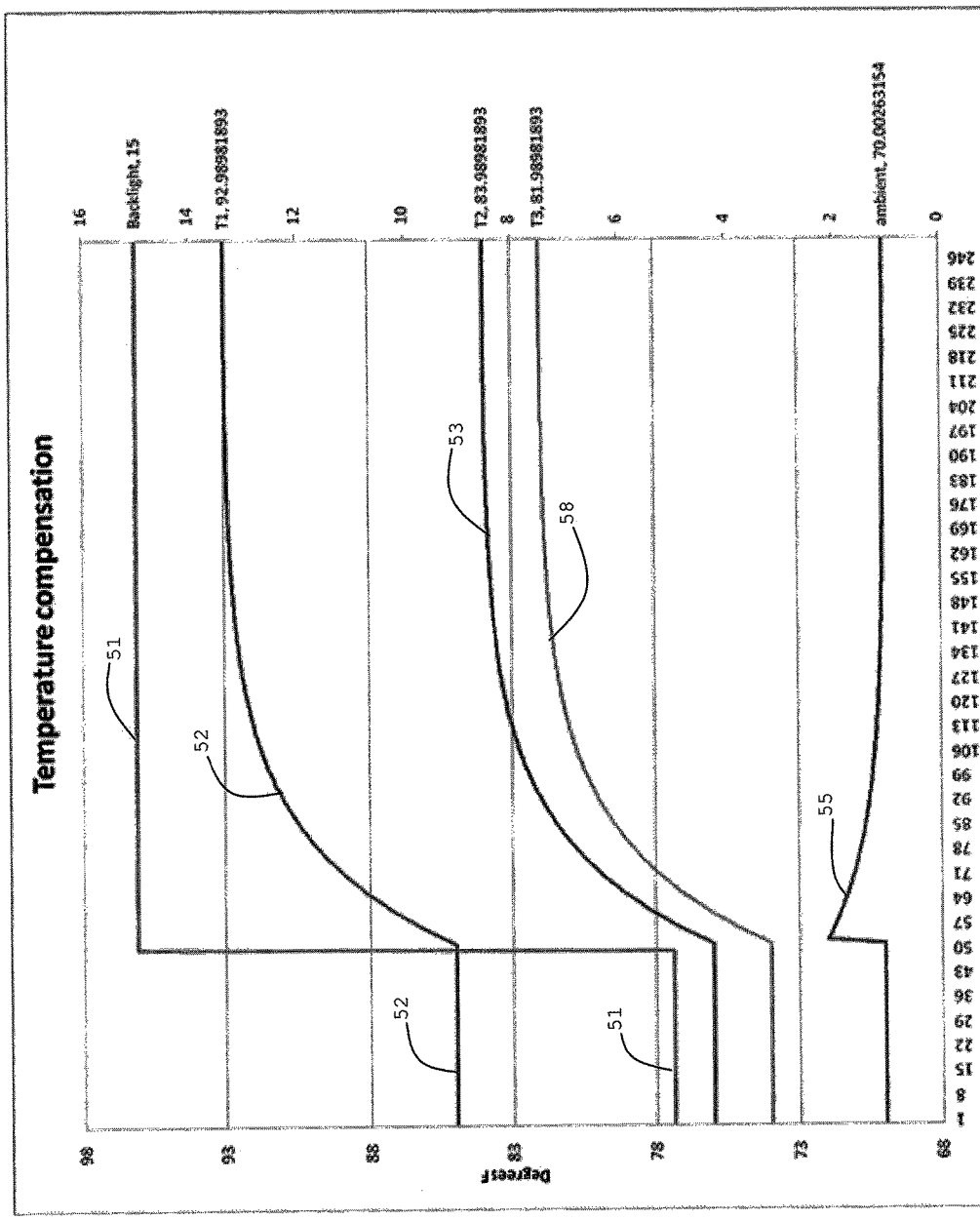

FIG. 2 is a diagram of a graph that shows how backlight dependant temperature compensation would look like (one may note that this is an illustration and does not represent a specific real-life condition). When a backlight changes from 5 to 15 units of magnitude on curve 51 as indicated on the right vertical axis, then the temperatures $T_1$, $T_2$ and $T_3$ may rise inside the case of the device, as indicated by curves 52, 53 and 58 from information from sensors 12, 13 and 18, respectively. However, a temperature compensation equation is dependent on backlight and therefore the compensation temperature sees a step immediately, but as time goes by, $T_1$, $T_2$, and $T_3$ of curves 52, 53 and 58, respectively, may come to a steady state and calculated ambient temperature shown by curve 55 may stabilize back to 70 degrees.

Figure 3:
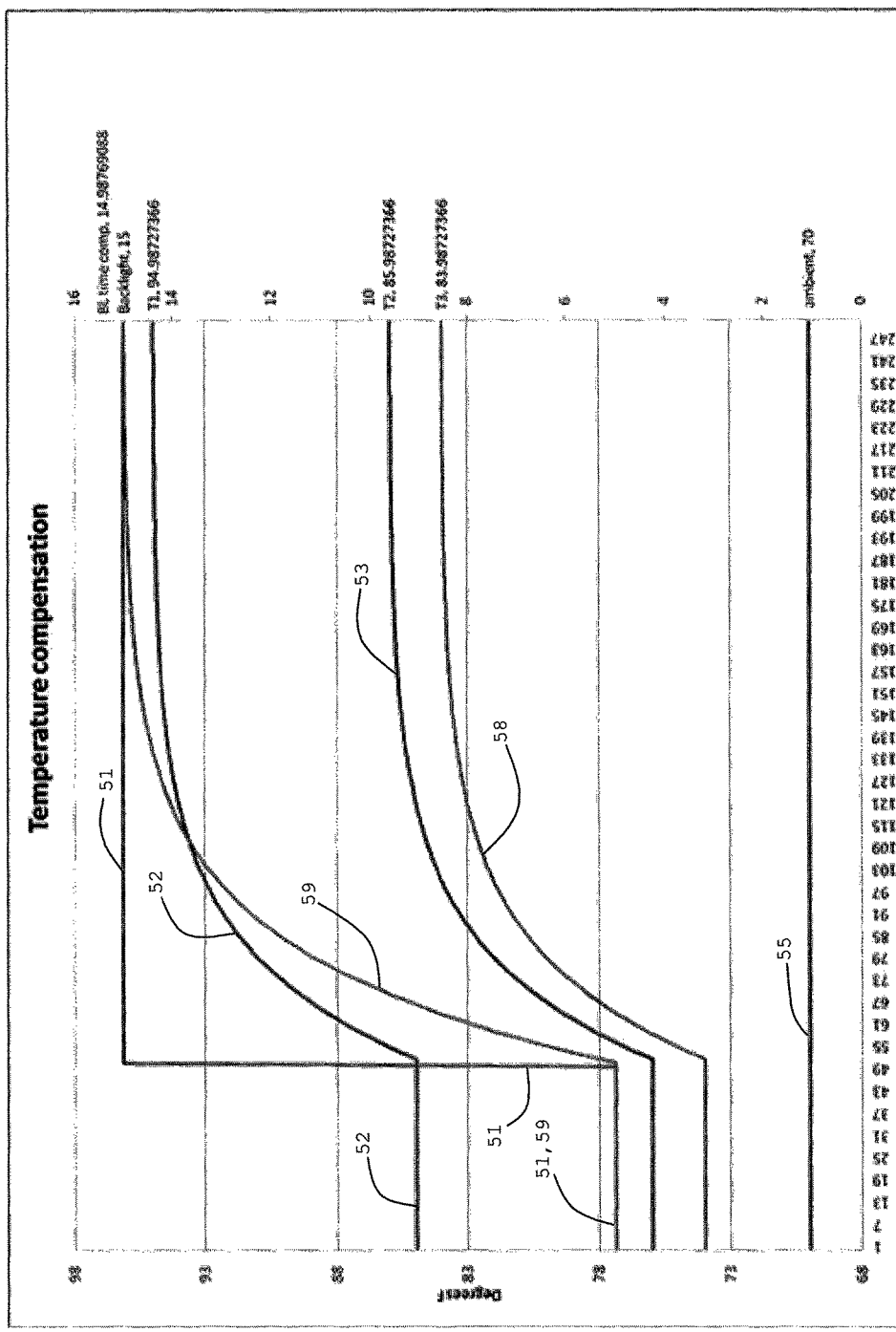

The following graph of FIG. 3 shows how time compensated terms can soften or even eliminate the step. By applying a software time constant and recreating step (instantaneous) changing terms, temperature compensation may be continuous and does not necessarily have to wait for all temperatures to stabilize. As can be seen from FIG. 3, t BL TIME COMP, as indicated by curve 59, may be the same as backlight but is reconstructed to follow the response of the system. The backlight instantaneous may be equal to the backlight (final) minus (the backlight difference between final and initial) times e^(t/tau). The outcome may eliminate or soften the step effect on the calculated ambient temperature of curve 55. This approach may be applicable to other kinds of such heat generating sources.

Implementation in the device may be a multi-term equation. The term factors may be determined empirically or based on fundamentals of thermal dynamics. The equation may provide a solution for the static heat rise conditions. In addition, the heat rise step response due to backlight change may be described as a logarithmic relationship over time. Applying the relationship to the inferred backlight setting may remove instantaneous temperature calculation errors upon backlight condition changes.

Another application of the 3-D model may give an additional factor to a dynamic heat source of a known or measured magnitude. This may allow measurement of the system with a changing heat source. For example, if the new factor for dynamic heat source is E and the magnitude of that factor is w the equation will resemble Ax+By+Cz+D+Ew=0. Assuming the same relations to the previous 3-D equation one may calculate ambient with:

$$T_{Ambient} = (A*T_1 + B*T_2 + C*T_3 + Ew + D)/(A+B+C).$$

In another sense, the equation may be:

$$T_{Ambient} = (A*T_1 + B*T_2 + C*T_3 + E*(\text{Final}-(\text{Final}-\text{Initial}) *e^{(-t/\text{tau})}) + D)/(A+B+C);$$

"w" is the dynamic heat source level (time dependent);

"Final" may represent the new heat source level that has changed to in the example of FIGS. 1-3 that would be 15 units;

"Initial" may be the old heat source level that was present right before the change in the example of FIGS. 1-3 would the 5 units;

"t" may be the time that lapsed since the change (this may be seconds, minutes, hours, or the like);

"tau" ($\tau$) may be the time constant, which needs to be in the same units as "t"; and A, B, C, D and E may be constants.

"w" may be regarded as (Final-(Final-Initial)*e^(-t/tau)).

The result is that the heat source may become an offset to the equation but because it is changing, the offset is dynamic.

If the dynamic heat source is not measured but switched to specific level, the heat contribution may be predicted as a function of time. For instance, immediately after changing the level of the dynamic heat source, its contribution may be very close to its previous state. As the time after a change increases, the contribution may change toward the steady state magnitude of the switched level.

In sum, accurate ambient temperature sensing is needed in a thermostat application. Sensing temperature using thermistors, semiconductor temperature sensors, thermocouples or any other form of temperature sensors from within an enclosure of electronics or equipment may result in a temperature different than the ambient air temperature surrounding the enclosure of the equipment or device. The term "ambient" used herein refers to the volume proximate to, external of and surrounding the enclosure. The difference between the ambient and the sensed temperature may vary and be affected by the amount of electrical energy needed to power the device, ventilation, how close or far the temperature sensors are from warm components of the device, air flow surrounding the enclosure and/or device, device materials and their thermal conductivities, and so forth. If the amount of heat generated inside the enclosure is low and constant, constant temperature compensation might be sufficient. But when the heat generated inside the case or enclosure is high and variable, computing the ambient temperature may become very challenging.

The system may be used for enabling the device or a processor to calculate the ambient temperature by sensing two or more different temperature points within the enclosure. An algorithm used to calculate the ambient temperature may be independent of power consumption of the device.

Two or more temperature sensors may be placed in different locations within the enclosure of the device. In theory, any two locations that have different temperatures in steady state under a given load should work. In practice, one temperature sensor "$T_{hot}$" may be placed close to the heat generating components. The other temperature sensor "$T_{cool}$" may be placed in about the coldest location within the device. Under very stable ambient conditions, the temperatures may be sampled at different equipment or device power load conditions. The temperatures sampled may be used to generate equations in terms of power (by means of curve fitting). The equations may be regarded as approximations of two-dimensional and three-dimensional relationships which may be graphs, plots, representations, and/or the like.

The equations may include the following. $T_{cool} = T_{ambient} + f(x) > T_{cool}$ = determined cool temperature. x=power dissipated in the device. f(x)=heat rise with respect to power for the cool temperature sensor. $T_{hot} = T_{ambient}$ f(X) $>T_{hot}$=determined hot temperature. x=power dissipated in the device. f(x)=heat rise with respect to power for the hot temperature sensor. From the system of two equations, x and $T_{ambient}$ are unknowns. Once these equations are solved, $T_{ambient} = f(T_{cool}, T_{hot})$. And since $T_{cool}$ and $T_{hot}$ are determined values, the ambient temperature may be calculated from them. f(x) may be approximated (i.e., fitted) to a linear function, but the function may also be non-linear for increased accuracy; however, in the latter case f(x) might be more complicated to implement.

The approach does not necessarily suggest sensing ambient temperature via one sensor, such as a thermistor, then sensing a warm temperature via another sensor and calculating an error to compensate for the sensed ambient temperature. The ambient temperature may be calculated from two different temperatures within an enclosure of a device or equipment, and therefore ambient temperature becomes a function of both temperatures or a function of additional temperatures if more than two sensors are used, where the additional temperatures and the initial two temperatures are averaged together into two or three temperatures within the enclosure.

The approach does not require special algorithms for special cases; it may work well even if there is no heat generated within the device. The sought temperature is not necessarily time dependent; the ambient temperature may be a function of the different temperatures and be calculated virtually instantaneously.

Figure 4:
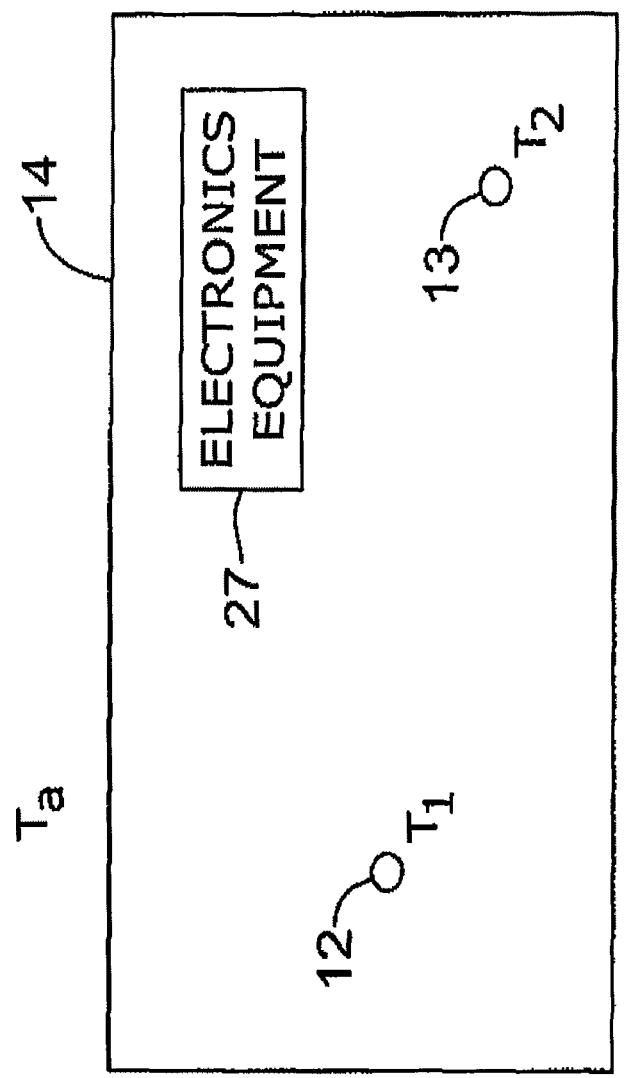
FIG. 4 is a diagram of enclosure having possibly power consuming equipment and temperature sensors for providing temperatures from two locations in the enclosure.

The system may use a two-dimensional (2-D) model with two or more temperature sensors in two groups of the sensors in an enclosure of some equipment, or a three-dimensional (3-D) model with three or more temperature sensors in three groups of sensors in the enclosure to determine the ambient temperature. Each group may provide an average temperature of the sensors in the group. The 3-D model may also be used to readily detect air flow. The equipment may be a piece of electronics that generates heat because of the usage of power within the enclosure where the sensors are placed. The equipment may be inactivated and the sensors detecting temperatures inside the enclosure of the equipment may themselves indicate the ambient temperature. Equations for determining ambient temperature from internal enclosure sensors may have a form of the following equation, $$T_a=(T_1-aT_2-b)/(1-a),$$

where $T_a$ is ambient temperature, $T_1$ represents a hotter temperature and $T_2$ represents a colder temperature in the enclosure 14 containing equipment 27. Sensors 12 and 13 for $T_1$ and $T_2$, respectively, may be situated in two different places of the enclosure 14, as shown in FIG. 4. Data may be taken and plotted on a two-dimensional graph as shown in FIG. 5. A classic form of the equation for a straight line fitted to a plot of temperature data may be $$y=ax+b.$$

Figure 6A:
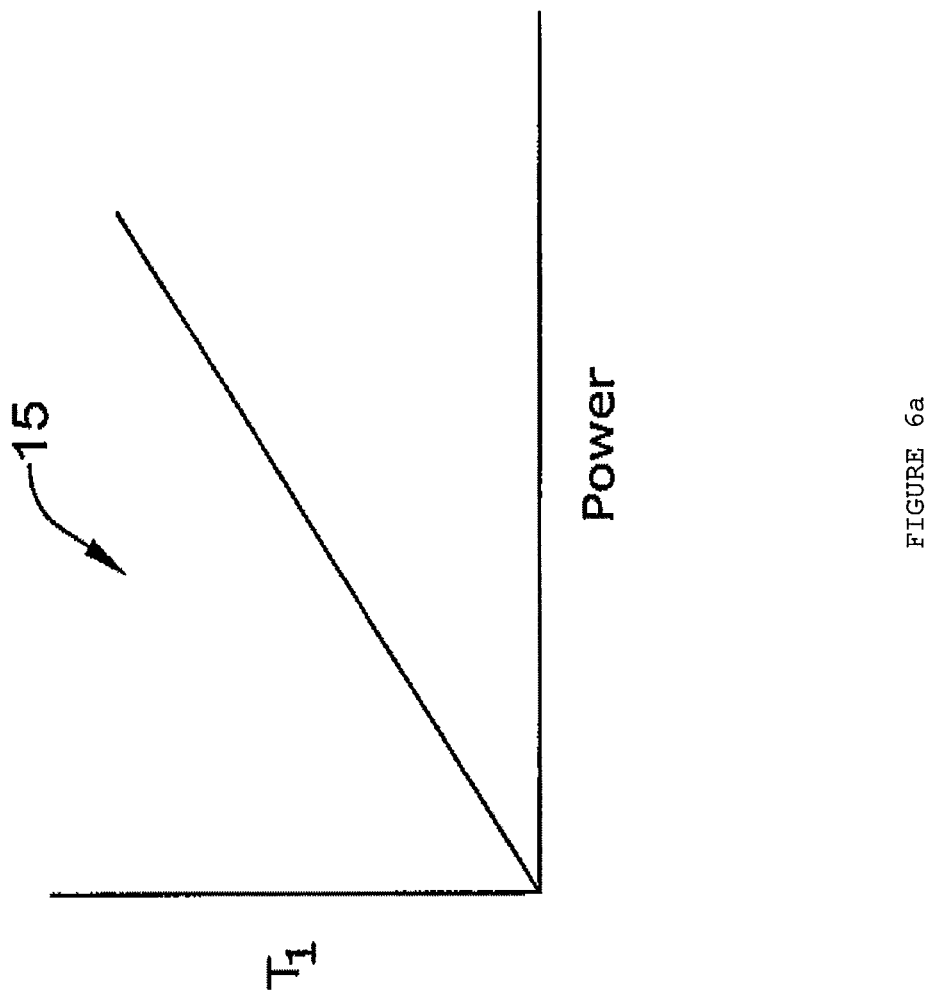
FIG. 6a a graph of a temperature of a first vicinity in the enclosure versus power.
Figure 6B:
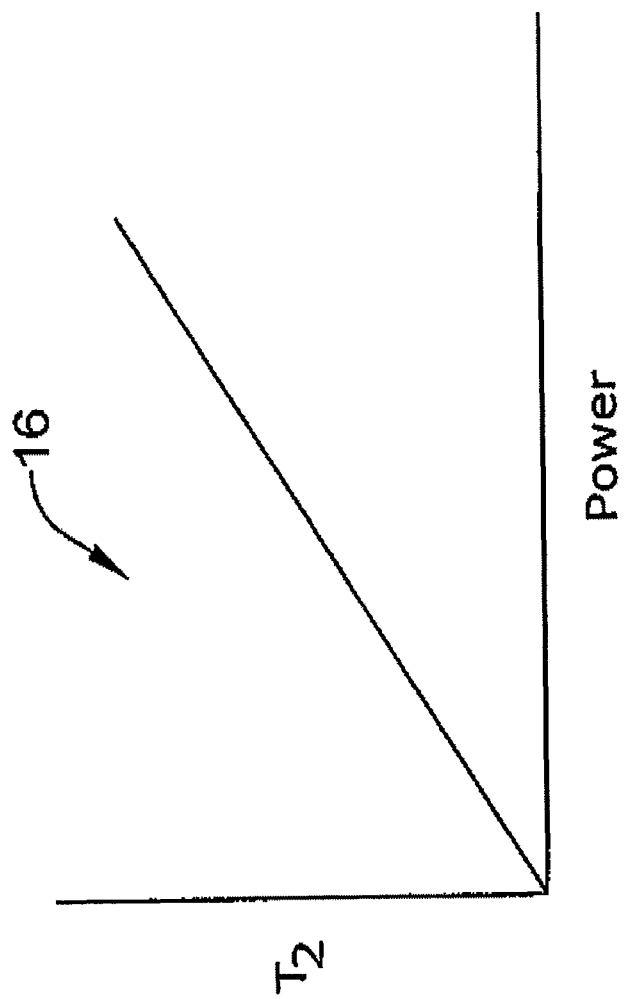
FIG. 6b a graph of a temperature of a second vicinity in the enclosure versus power.
Figure 6C:
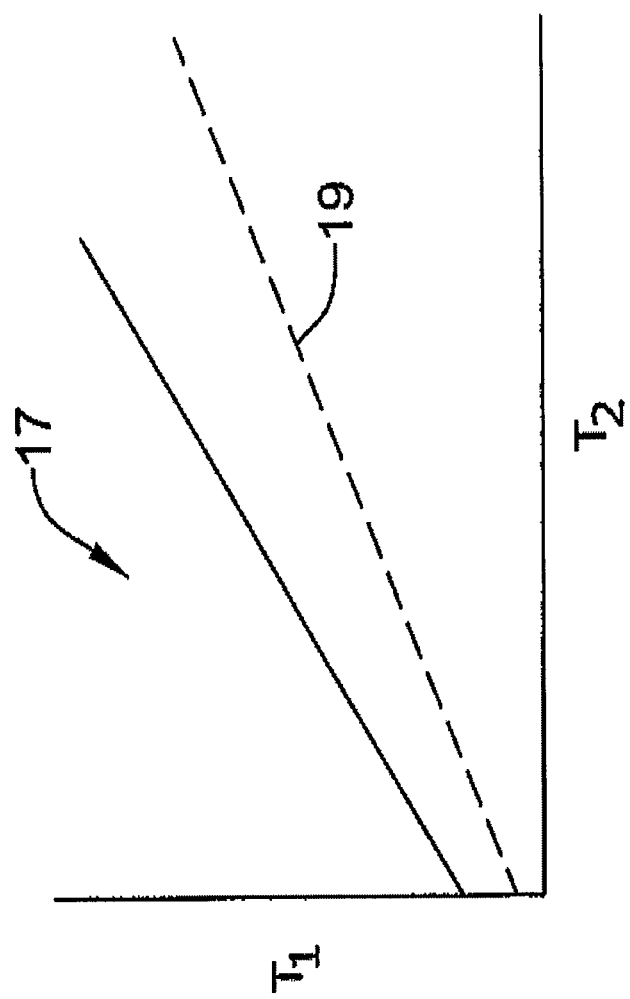
FIG. 6c is a graph resulting from a combining the graphs of FIGS. 6a and 6b into one of the first temperature of the first vicinity versus the temperature of the second vicinity of the enclosure.

From the graph, the constant "a" may be the slope and the constant "b" may be the offset of the line 11 from the zero coordinates. The "constant" nomenclature "a", "b", and so on, may be lower or upper case. The graph may show $T_1$ versus $T_2$ for various ambient temperatures. There may instead be two or more sensors situated in a vicinity representing $T_1$, and two or more sensors situated in another vicinity representing $T_2$, rather than single sensors representing $T_1$ and $T_2$, respectively. An output average of the two or more sensors may be taken for $T_1$ and an average of the other two or more sensors may be taken for $T_2$. An additional third sensor or group of sensors may be used for averaging with one or more sensors or for $T_3$ and for determining air flow direction and/or magnitude. For illustrative purposes, just two sensors 12 and 13 may be used in the enclosure 14. When the equipment or device 27 in the enclosure 14 is energized, one may have $T_1>T_2>T_a$. $T_1$ may be regarded as the $T_{hot}$ and $T_2$ may be regarded as $T_{cold}$. Using the equation, $$T_a=(T_1-aT_2-b)/(1-a),$$

with values provided for the constants, the ambient temperature $T_a$ may be determined. Values of the constants may be determined with data from empirical tests, simulations or calculations under conditions that the enclosure 14 is likely to be subject. Data may be taken from the temperature sensors and plotted in graphs 15 and 16 in FIGS. 6a and 6b for $T_1$ versus power and $T_2$ versus power, respectively. Data may be taken at different power levels of the equipment 27 in the enclosure 14. The ambient temperature may be held constant. The plots may be fitted with straight lines. The graphs 15 and 16 may be combined into a graph 17 in FIG. 6c. The common power determinations or measurements of the graphs 15 and 16 may drop out, resulting in $T_1$ versus $T_2$ in a graph 17. The slope value of the solid line in graph 17 may be determined and substituted for "a" and the offset from graph 17 may be determined, measured or calculated and substituted for "b". One set of data as shown in FIGS. 6a-6c may be sufficient in a situation where the direction and magnitude of air flow, if any, remain the same for measurements or determinations, or are negligible, and thus the resultant equation should be adequate in determining the ambient temperature $T_a$. Where air flow is changed, then a new set of data, like that in FIGS. 6a and 6b, should be taken for the equipment 27 of enclosure 14 situated in the new air flow. The new air flow may result in a different line (dashed) 19 in graph 17 of FIG. 6c.

Figure 7:
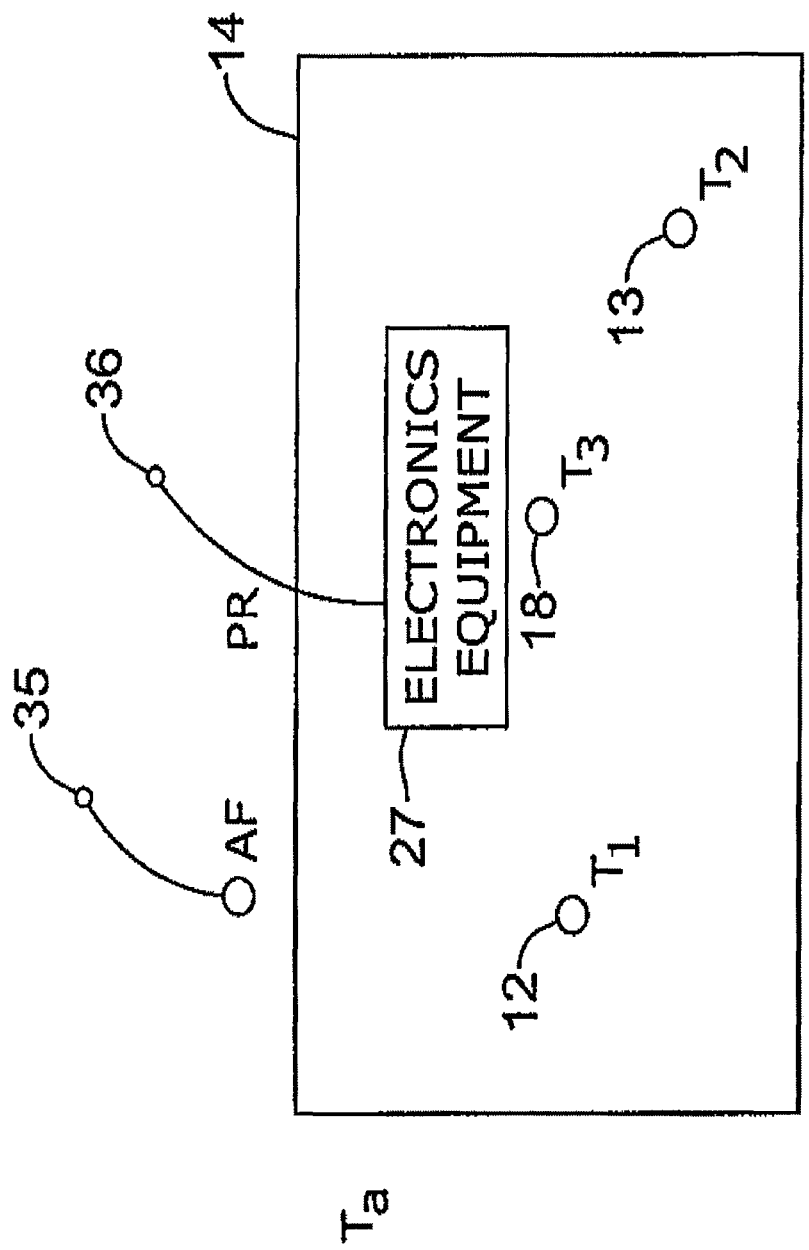
FIG. 7 is a diagram of an enclosure of equipment having sensors for providing temperatures from three locations in the enclosure.
Figure 7A:
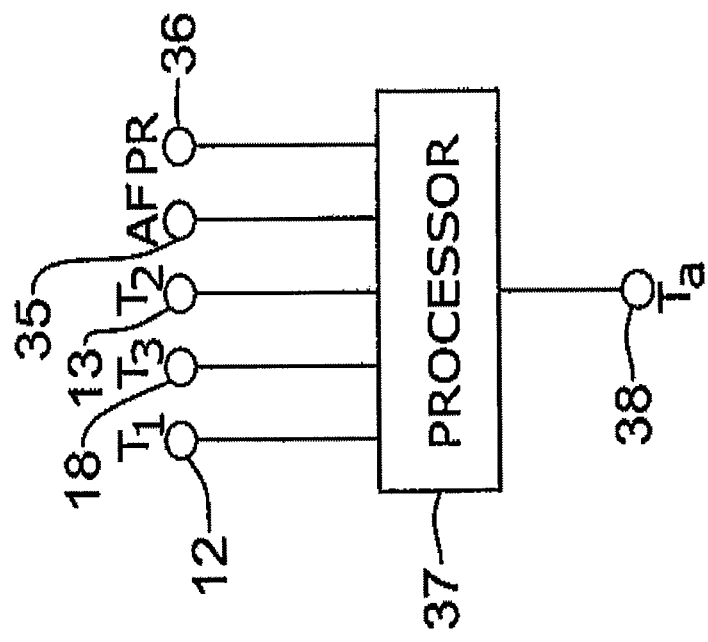
FIG. 7a is a diagram of a processor with inputs from various sensors pertinent to the enclosure.

The two-dimensional approach just noted herein may be extended to a three-dimensional approach with a third sensor 18 situated in the enclosure 14, as illustratively shown in FIG. 7. FIG. 7a shows a processor 37 which may determine an ambient temperature proximate to the enclosure 14 based on outputs from temperature sensors 12, 18 and 13, an air flow sensor 35 proximate (external and/or internal) to the enclosure, and a power level sensor 36 connected to a power input to the electronics equipment 27 and/or processor 37. The ambient temperature may be indicated at an output 38 of the processor 37 or electronics 27. Electronics 27 or processor 37 may be configured for either the two-dimensional approach and/or the three-dimensional approaches as noted herein. Processor 37 may be internal or external to enclosure 14.

The 3-D approach may result in an equation which accommodates various air flows. The resultant plot of the data may result in a 3-D surface. The simplest form of this surface is a plane of a 3-axis coordinate system. The basic equation form may be $$ax+by+cz+d=0.$$

For improved accuracy, a more complicated non-linear 3-D surface equation may be generated from the data. Three temperature readings for $T_1$ sensor 12, $T_2$ sensor 13 and $T_3$ sensor 18 may be taken for each power level at various air flows or vice versa. The ambient temperature should be constant during the data taking.

For an illustrative example of data taking and determining the values of the constants for the three equations of the three-dimensional approach, one may note tables of FIG. 8. Each sensor and respective temperature may represent a coordinate axis of a 3-axis or 3-D graph 24 in FIG. 9. In table 21, temperature determinations or measurements $T_1$, $T_2$ and $T_3$ from sensors 12, 13 and 18 for a first air flow and a first power level may be 85, 78 and 74 degrees F., respectively; for the first air flow and second power level, the determinations or measurements may be 88, 79 and 76 degrees, respectively; and for the first air flow and third power level, the determinations or measurements may be 89, 84 and 79, respectively. In table 22, temperature determinations or measurements $T_1$, $T_2$, and $T_3$ from sensors 12, 13 and 18 for a second air flow and the first power level may be 80, 76, and 71 degrees, respectively; for the second air flow and the second power level, the determinations or measurements may be 84, 78 and 75 degrees, respectively; and for the second air flow and the third power level the determinations or measurements may be 86, 81 and 77 degrees, respectively. In table 23, temperature determinations or measurements $T_1$, $T_2$, and $T_3$ from sensors 12, 13 and 18 for a third air flow and the first power level, the determinations or measurements may be 91, 80 and 76 degrees, respectively; and for the third air flow and the second power level the determinations or measurements may be 93, 84, and 78 degrees, respectively; and for the third air flow and the second power level, the determinations or measurements may be 95, 88 and 82 degrees, respectively.

Figure 9:
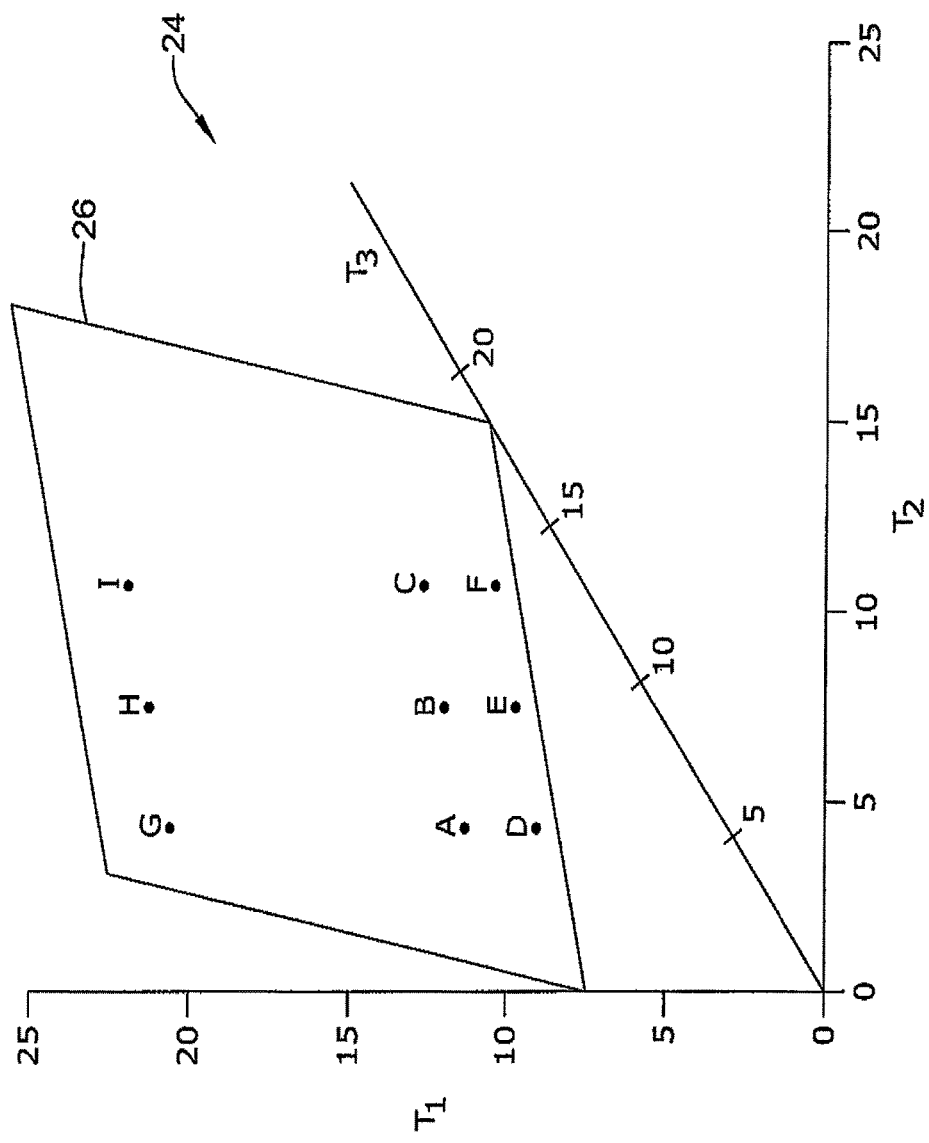
FIG. 9 is a three-coordinate graph having a plot of the data of FIG. 6 which is plane-fitted with an equation.

Since the ambient temperature ($T_a$) may be regarded as at 70 degrees F., during data determination or a taking of the empirical measurements, the data may be adjusted for $T_a$, resulting in data points for plotting on the 3-coordinate graph 24, as illustrated in FIG. 9. The data points may be 15, 8, 4; 18, 9, 6; and 19, 14, 9; for air flow 1 and power levels 1, 2 and 3, respectively. Data points may be 10, 6, 1; 14, 8, 5; and 16, 11, 7; for air flow 2 and power levels 1, 2 and 3, respectively. Data points may be 21, 10, 6; 23, 14, 8; and 25, 18, 12; for air flow 3 and power levels 1, 2 and 3, respectively. The data points from 15, 8, 4 through 25, 18, 12, as indicated herein, may be labeled A, B, C, D, E, F, G, H and I, respectively. The latter labels may be used in graph 24.

One may plane fit the data points and come up with a plane 26 and a corresponding equation. These data points may be inserted in versions of the following equation, $$ax+by+cz+d=0,$$

to obtain values for the respective constants for the ultimate equation for obtaining $T_a$ from $T_1$, $T_2$ and $T_3$ at various air flows and power levels of the enclosure 14 and equipment 27.

Figure 10:
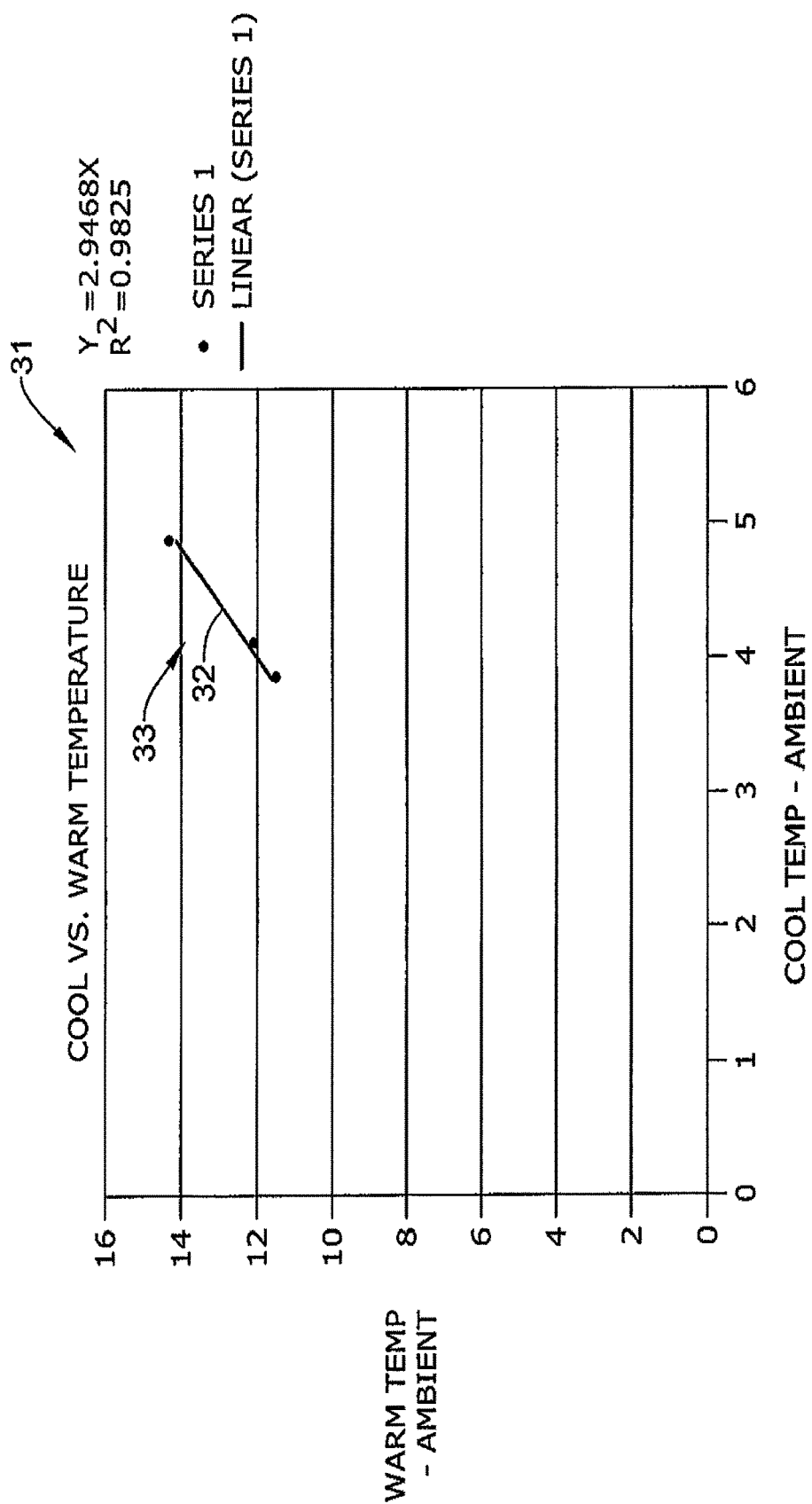
FIG. 10 is a two-coordinate graph of cool versus warm temperatures.

For an illustrative example, with respect to the 2-D model, the following temperatures were logged at 70 degrees F. ambient condition. These are at 3 different load conditions. The cool temperatures are 73.95439, 74.14308 and 74.80374 degrees F. The warm temperatures are 81.49281, 82.11406 and 84.3687. From these temperatures, one may subtract temperatures from the ambient temperature and graph. The results from the cool temperatures are 3.95439, 4.14308 and 4.80374. The results from the warm temperatures are 11.49281, 12.11406 and 14.3687. The results for both sets of temperatures may be plotted as coordinate points 33 a graph 31 of FIG. 10. One may generate a best curve fit 32. In this condition, it happens to be linear.

$$T_{warm}-T_{ambient}=A*(T_{cool}-T_{ambient})+B,$$

where A=2.9468 and B=0. One may look to the plot 33 and linear curve 32 fitting in graph 31 of FIG. 10.

$$\text{One may have } T_{ambient}=T_{warm}-A*T\text{-cool } B)/(1-A).$$

After applying this equation to the original temperature, the calculated ambient temperatures are 70.08218, 70.04868 and 69.89057, respectively. As may be seen, the temperatures appear accurate. And since the above items have been the extreme load conditions, different loads in between would generate temperatures that fall on the same curve and therefore the ambient temperature can be recovered. When the same device is exposed to different ambient temperatures, the temperature rise on the sensors is constant and the ambient temperature may be recovered. With an example at ambient temperature=80 degrees, one may get cool temperatures of 84.03199, 83.59956 and 84.8985, and hot temperatures of 92.10085, 91.00635 and 94.71613. The calculated temperatures may be 79.88731, 79.79496 and 79.85554, respectively.

Figure 11:
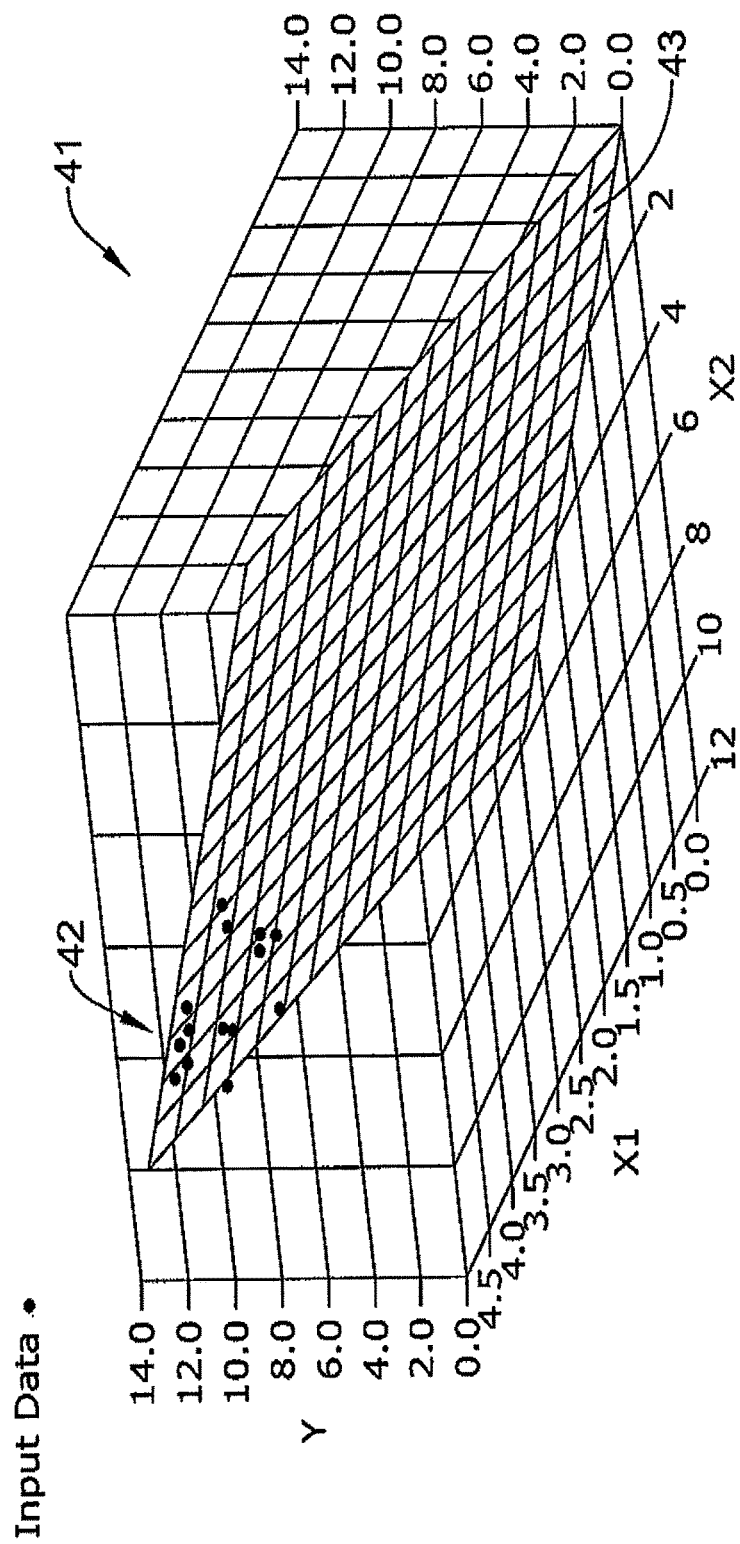
FIG. 11 is a three-coordinate graph having a plot of another set of data which is plane-fitted with an equation.

With respect to a 3-D model, three given different temperature sensors will generate a 3-D surface equation, in the case of a linear approach, this would be a plane. For example, Ax+By+Cz+D=0. Assuming that the plane crosses at (0,0,0), which means if no heat is generated within the device, then the temperature sensed by the sensors=ambient.

$$Ax+By+Cz=0, x,y,z \text{ are } T_1-T_{ambient}, T_2-T_{ambient}, \text{ and } T_3-T_{ambient}, \text{respectively.}$$

$$T_{Ambient}=(A*T_1+B*T_2+C*T_3)/(A+B+C),$$

where A, B and C are plane constants, and may be calculated algebraically or by the use of curve/surface fit software In some cases, temperatures inside an enclosure might be affected by external environmental changes and a 2-D solution might not be sufficient to recover ambient temperature accurately. For instance, airflow direction or speed may cause some variation and constantly generate temperatures that do not fall on a 2-D dimensional curve. With a third sensor, temperature variations may be modeled with a surface of 3-D equation. A graph 41 in FIG. 11 shows an example of that. In this example, the points 42 are surface fit to a plane 43, instead of a 2-D curve or a line 32 as in FIG. 10.

Determinations, measurements, plotting, graphs, curve-, line- and plane-fitting, calculations, approximations, relationships, representations, managing equations and getting solutions, obtaining values for constants and temperatures such as ambient, doing flow and power level determinations or measurements, and other items for effecting the present system, and so forth, may be effected electronically with a processor or the like, along with appropriate software as desired or needed.

To recap, a thermostat that functions to provide control signals to temperature control equipment to maintain a desired temperature in a space, may incorporate a housing, one or more heat generating elements in the housing, where during operation of the thermostat, the one or more heat generating elements cause a first region within the housing to be warmer than a second region within the housing. There may be a first temperature sensor for reporting a measure that is related to the temperature in the first region, a second temperature sensor for reporting a measure that is related to the temperature in the second region, and a controller in communication with the first temperature sensor and the second temperature sensor. The controller may determine a measure related to an ambient temperature outside of the housing based, at least in part, on the measure that is related to the temperature in the first region reported by the first temperature sensor and the measure that is related to the temperature in the second region reported by the second temperature sensor.

The thermostat may use the measure related to the ambient temperature outside of the housing to determine one or more control signals for controlling temperature control equipment. The thermostat is powered, at least in part, by electrical energy. The one or more heat generating components may generate heat by consuming the electrical energy. A level of electrical energy needed to power the thermostat, such as one or more heat generating elements, may change over time. The first temperature sensor and/or the second temperature sensor may report a measure that is related to the temperature in the first region or the second region, respectively, which changes over time in a rapid or slow manner, correspondingly, at least in part, to the changes of energy over time needed to power the thermostat incorporating the heat generating elements. The changes over time in a rapid manner may be compensated so as to avoid affecting determination of ambient temperature changes over time in a slow manner of the first temperature sensor and/or the second temperature sensor which reports a measure that is related to the temperature in the first region or the second region, respectively.

The one or more heat generating elements may incorporate a display backlight which is at certain times turned on resulting in one or more changes in a rapid manner. A change over time in a rapid manner may be a rise of a measure of the first sensor or the second sensor of greater than a predetermined rate of X degrees F. per second. A heat generating element may be some other device with a rapid manner change.

The controller may compensates for the temperature in the first region or the second region, respectively, which changes over time in a rapid or slow manner, correspondingly, at least in part, to changes of energy needed over time to power one or more heat generating components, to result in the controller determining the measure related to an ambient temperature outside of the housing, at least in part, on the measure that is related to the temperature in the first region reported by the first temperature sensor and the measure that is related to the temperature in the second region reported by the second temperature sensor.

The measure related to the ambient temperature determined by the controller may be relatively independent of the level of the electrical energy needed to power the thermostat. The controller may determine the measure related to the ambient temperature outside of the housing based, at least in part, on a predetermined relationship between the measure related to the ambient temperature outside of the housing, the measure related to the temperature in the first region reported by the first temperature sensor and the measure related to the temperature in the second region reported by the second temperature sensor.

The thermostat may be powered by a level of electrical energy that changes over time, and where the measure related to the ambient temperature is relatively independent of the level of electrical energy powering the thermostat.

A change over time in a rapid manner may be a rise of a measure of the first sensor or the second sensor of greater than a predetermined rate of X degrees F. per second.

The thermostat may further incorporate a third temperature sensor for reporting a measure that is related to the temperature in a third region within the housing. The controller may determine a measure related to an air flow direction and/or air flow magnitude about the housing that is based, at least in part, on the measure related to the temperature in the third region reported by the third temperature sensor. The controller may use the measure related to the air flow direction and/or air flow magnitude about the housing when determining the measure related to the ambient temperature outside of the housing.

The thermostat may further incorporate a third temperature sensor for reporting a measure that is related to the temperature in a third region within the housing. The measure related to an ambient temperature outside of the housing based, at least in part, on the measure that is related to the temperature in the first region reported by the first temperature sensor, the measure that is related to the temperature in the second region reported by the second temperature sensor, and the measure that is related to the temperature in the third region reported by the third temperature sensor, may be according to $T_{Ambient}=(A*T_1+B*T_2+C*T_3+E*(Final-(Final-Initial)*e^{(-t/tau)})+D)/(A+B+C)$, where $T_1$ is the measure reported by the first temperature sensor, $T_2$ is the measure reported by the second temperature sensor, $T_3$ is the measure reported by the third temperature sensor, E is a dynamic heat source factor, Final is a new heat source level, Initial is an old heat source level before a change, t is time that lapsed since a change, tau is a time constant, and A, B, C, D and E are constants. A dynamic heat source may be a heat generating component that is powered by changes of energy over time which results, at least in part, the temperature in the first, second and/or third region, changing over time in a rapid manner. The rapid manner may be greater than a predetermined rate of X degrees F. per second.

An approach for determining an ambient temperature outside an enclosure, may incorporate detecting a first temperature over a period of time at a first location in an enclosure, detecting a second temperature over the period of time at a second location in the enclosure, determining a first change of the first temperature over the period of time, from the first temperature over the period of time, detecting a second change of the second temperature over the period of time, from the second temperature over the period of time, selecting from the first change of the first temperature and the second change of the second temperature, a greatest change of temperature, over the period of time, and determining whether the greatest change of temperature is dynamic. A change of temperature may be dynamic when the change exceeds a predetermined rate of X degrees F. per second.

A relationship may generate an ambient temperature outside of the enclosure relative to the first temperature, the second temperature, the first change of temperature and the second change of temperature. The ambient temperature may be determined from the relationship. The relationship may incorporate compensation for the dynamic change of temperature. Sensors and a controller may be used to detect the temperatures, the changes of temperatures, select the greatest change of temperature, generate the relationship having the compensation and determine the ambient temperature from the relationship.

The relationship may be $T_A=(A*T_1+B*T_2+E*(Final-(Final-Initial)*e^{(-t/tau)})+D)/(A+B)$, where $T_A$ is ambient temperature, $T_1$ is the first temperature over the period of time, $T_2$ is the second temperature over the period of time, E is a dynamic heat source factor, w is a dynamic heat source level, Final is a new heat source level, Initial is an old heat source level before a change, t is time that lapsed since the change, tau is a time constant, and A, B, D and E are constants.

The approach may further incorporate detecting a third temperature over a period of time, determining a third change of the third temperature over the period of time, and identifying the change or changes of temperature that are dynamic. The relationship may be $T_A=(A*T_1+B*T_2+C*T_3+E*(Final-(Final-Initial)*e^{(-t/tau)})+D)/(A+B+C)$, where $T_A$ is ambient temperature, $T_1$ is the first temperature over the period of time, $T_2$ is the second temperature over the period of time, $T_3$ is the third temperature over the period of time, E is a dynamic heat source factor, Final is a new heat source level, Initial is an old heat source level before a change, t is time that lapsed since the change, tau is a time constant, and A, B, C, D and E are constants.

Values of the constants may be determined with data of empirical tests, simulations and/or calculations under conditions of the enclosure. Data may incorporate first, second and third temperatures over a period of time.

The enclosure may incorporate a backlight. Turning on the backlight may cause at least one of the first, second and third changes of temperature to be dynamic.

The controller may incorporate a thermostat connected to the sensors. The controller may determine one or more control signals for controlling temperature control equipment based, at least in part, on the ambient temperature.

A system for determining ambient temperature may incorporate an enclosure, a first temperature sensor situated at a first location in the enclosure, a second temperature sensor situated at a second location in the enclosure which is spaced from the first location, a controller receiving a first temperature from the first temperature sensor and a second temperature from the second temperature sensor, and a dynamic heat generating component situated in the enclosure. The dynamic heat generating component, when turned on, may cause, at least in part, the first temperature and/or the second temperature to change greater than a predetermined rate of X degrees F. per second. The controller may determine a measure related to an ambient temperature outside of the enclosure based, at least in part, on the first temperature and the second temperature, and on a greater than predetermined rate of X degrees F. per second of temperature change of the first temperature and/or the second temperature.

The measure may be from an algorithm which determines the ambient temperature from the first temperature and the second temperature, and compensates for a temperature change of the first temperature and/or the second temperature greater than the predetermined rate of X degrees F. per second.

The measure may be from an algorithm incorporating an equation, $T_A=(AT_1+BT_2+Ew+D)/(A+B)$, where $T_A$ is ambient temperature, $T_1$ is the first temperature, $T_2$ is the second temperature, E is a dynamic heat source factor, w is a dynamic heat source level, and A, B, D and E are constants.

The dynamic heat generating component may be a backlight in the enclosure which is turned on to view a display. Another item may be such a component in the enclosure.

The system may further incorporate a third temperature sensor situated at a third location in the enclosure, which is spaced from the first location and the second location. The controller may also receive a third temperature from the third temperature sensor. The dynamic heat generating component may cause at least in part the first temperature, the second temperature and/or the third temperature to change greater than the predetermined rate of X degrees F. per second. The controller may determine a measure related to an ambient temperature outside of the enclosure based, at least in part, on the first temperature, the second temperature and the third temperature on a greater than predetermined rate of X degrees F. per second of temperature change of the first temperature, the second temperature and/or the third temperature.

The measure may be from an algorithm incorporating an equation, $T_A=(AT_1+BT_2+CT_3+Ew+D)/(A+B+C)$, where $T_A$ is ambient temperature, $T_1$ is the first temperature, $T_2$ is the second temperature, $T_3$ is the third temperature, E is a dynamic heat source factor, w is a dynamic heat source level, and A, B, C, D and E are constants.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A thermostat that functions to provide control signals to temperature control equipment to maintain a desired temperature in a space, comprising:
   a housing;
   one or more heat generating elements in the housing, wherein during operation of the thermostat, the one or more heat generating elements cause a first region within the housing to be warmer than a second region within the housing;
   a first temperature sensor for reporting a measure that is related to the temperature in the first region;
   a second temperature sensor for reporting a measure that is related to the temperature in the second region;
   a controller in communication with the first temperature sensor and the second temperature sensor, the controller determining a measure related to an ambient temperature outside of the housing based, at least in part, on the measure that is related to the temperature in the first region reported by the first temperature sensor and the measure that is related to the temperature in the second region reported by the second temperature sensor; and wherein:
   the thermostat uses the measure related to the ambient temperature outside of the housing to determine one or more control signals for controlling temperature control equipment;
   the thermostat is powered, at least in part, by electrical energy;
   the one or more heat generating elements generate heat by consuming the electrical energy;
   a level of electrical energy needed to power the thermostat changes over time;
   the first temperature sensor and/or the second temperature sensor report a measure that is related to the temperature in the first region or the second region, respectively, which changes over time in a rapid or slow manner, correspondingly, at least in part, to the changes of energy over time needed to power the thermostat incorporating the heat generating elements; and
   the changes over time in a rapid manner are compensated so as to avoid affecting determination of ambient temperature changes over time in a slow manner of the first temperature sensor and/or the second temperature sensor which reports a measure that is related to the temperature in the first region or the second region, respectively.

2. The thermostat of claim 1, wherein the one or more heat generating elements comprises a display backlight which is at certain times turned on resulting in one or more changes in a rapid manner.

3. The thermostat of claim 1, wherein the controller compensates for the temperature in the first region or the second region, respectively, which changes over time in a rapid or slow manner, correspondingly, at least in part, to changes of energy needed over time to power one or more heat generating elements, to result in the controller determining the measure related to an ambient temperature outside of the housing, at least in part, on the measure that is related to the temperature in the first region reported by the first temperature sensor and the measure that is related to the temperature in the second region reported by the second temperature sensor.

4. The thermostat of claim 3, wherein the measure related to the ambient temperature determined by the controller is relatively independent of the level of the electrical energy needed to power the thermostat.

5. The thermostat of claim 3, wherein the controller determines the measure related to the ambient temperature outside of the housing based, at least in part, on a predetermined relationship between the measure related to the ambient temperature outside of the housing, the measure related to the temperature in the first region reported by the first temperature sensor and the measure related to the temperature in the second region reported by the second temperature sensor.

6. The thermostat of claim 5, wherein the thermostat is powered by a level of electrical energy that changes over time, and wherein the measure related to the ambient temperature is relatively independent of the level of electrical energy powering the thermostat.

7. The thermostat of claim 3, wherein a change over time in a rapid manner is a rise of a measure of the first sensor or the second sensor of greater than a predetermined rate of X degrees Fahrenheit per second.

8. The thermostat of claim 3, further comprising:
a third temperature sensor for reporting a measure that is related to the temperature in a third region within the housing;
the controller determining a measure related to an air flow direction and/or air flow magnitude about the housing that is based, at least in part, on the measure related to the temperature in the third region reported by the third temperature sensor; and
the controller using the measure related to the air flow direction and/or air flow magnitude about the housing when determining the measure related to the ambient temperature outside of the housing.

9. The thermostat of claim 3, further comprising:
a third temperature sensor for reporting a measure that is related to the temperature in a third region within the housing; and
wherein:
the measure related to an ambient temperature outside of the housing based, at least in part, on the measure that is related to the temperature in the first region reported by the first temperature sensor, the measure that is related to the temperature in the second region reported by the second temperature sensor, and the measure that is related to the temperature in the third region reported by the third temperature sensor, is according to $$T_{Ambient}=(A*T_1+B*T_2+C*T_3+E*(\text{Final}-(\text{Final}-\text{Initial})*e^{\wedge}(-t/\text{tau}))+D)/(A+B+C);$$

$T_1$ is the measure reported by the first temperature sensor;
$T_2$ is the measure reported by the second temperature sensor;
$T_3$ is the measure reported by the third temperature sensor;
E is a dynamic heat source factor;
Final is a new heat source level;
Initial is an old heat source level before a change;
t is time that lapsed since a change;
tau is a time constant;
A, B, C, D and E are constants;
a dynamic heat source is a heat generating element that is powered by changes of energy over time which results, at least in part, the temperature in the first, second and/or third region, changing over time in a rapid manner; and
the rapid manner is greater than a predetermined rate of X degrees Fahrenheit per second.

10. A method for determining an ambient temperature outside an enclosure, comprising:
detecting a first temperature over a period of time at a first location in an enclosure;
detecting a second temperature over the period of time at a second location in the enclosure;
determining a first change of the first temperature over the period of time, from the first temperature over the period of time;
detecting a second change of the second temperature over the period of time, from the second temperature over the period of time;
selecting from the first change of the first temperature and the second change of the second temperature, a greatest change of temperature, over the period of time;
determining whether the greatest change of temperature is dynamic;
a change of temperature is dynamic when the rate of change exceeds a predetermined rate of X degrees Fahrenheit per second;
generating a relationship between an ambient temperature outside of the enclosure and the first temperature, the second temperature, the first change of temperature and the second change of temperature; and
determining the ambient temperature from the relationship; and
wherein the relationship incorporates compensation for the dynamic change of temperature.

11. The method of claim 10, wherein:
the relationship is $$T_A=(A*T_1+B*T_2+E*(\text{Final}-(\text{Final}-\text{Initial})*e^{\wedge}(-t/\text{tau}))+D)/(A+B);$$

$T_A$ is ambient temperature;
$T_1$ is the first temperature over the period of time;
$T_2$ is the second temperature over the period of time;
E is a dynamic heat source factor;
w is a dynamic heat source level;
Final is a new heat source level;
Initial is an old heat source level before a change;
t is time that lapsed since the change;
tau is a time constant; and
A, B, D and E are constants.

12. The method of claim 10, further comprising:
detecting a third temperature over a period of time;
determining a third change of the third temperature over the period of time; and
identifying the change or changes of temperature that are dynamic, and
wherein:
the relationship is $$T_A=(A*T_1+B*T_2+C*T_3+E*(\text{Final}-(\text{Final}-\text{Initial})*e^{\wedge}(-t/\text{tau}))+D)/(A+B+C);$$

$T_A$ is ambient temperature;
$T_1$ is the first temperature over the period of time;
$T_2$ is the second temperature over the period of time;
$T_3$ is the third temperature over the period of time;
E is a dynamic heat source factor;
Final is a new heat source level;
Initial is an old heat source level before a change;
t is time that lapsed since the change;
tau is a time constant; and
A, B, C, D and E are constants.

13. The method of claim 12, wherein:
values of the constants are determined with data of empirical tests, simulations and/or calculations under conditions of the enclosure; and
data comprise first, second and third temperatures over a period of time.

14. The method of claim 12 wherein:
the enclosure comprises a backlight; and
turning on the backlight causes at least one of the first, second and third changes of temperature to be dynamic.

15. The method of claim 10, wherein:
the controller comprises a thermostat connected to the sensors; and
the controller determines one or more control signals for controlling temperature control equipment based, at least in part, on the ambient temperature.

16. A system for determining ambient temperature comprising:
an enclosure;
a first temperature sensor situated at a first location in the enclosure;
a second temperature sensor situated at a second location in the enclosure which is spaced from the first location;

a controller receiving a first temperature from the first temperature sensor and a second temperature from the second temperature sensor; and a dynamic heat generating element situated in the enclosure; and wherein the dynamic heat generating element, when turned on, causes at least in part, the first temperature and/or the second temperature to change greater than a predetermined rate of X degrees Fahrenheit per second; and wherein the controller determines a measure related to an ambient temperature outside of the enclosure based, at least in part, on the first temperature and the second temperature, and on greater than the predetermined rate of X degrees Fahrenheit per second of temperature change of the first temperature and/or the second temperature.

17. The system of claim 16, wherein the measure is from an algorithm which determines the ambient temperature from the first temperature and the second temperature, and compensates for a temperature change of the first temperature and/or the second temperature greater than the predetermined rate of X degrees Fahrenheit per second.

18. The system of claim 16, wherein:

the measure is from an algorithm comprising an equation, $$T_A = (AT_1 + BT_2 + Ew + D)/(A+B);$$

$T_A$ is ambient temperature;
$T_1$ is the first temperature;
$T_2$ is the second temperature;
E is a dynamic heat source factor;
w is a dynamic heat source level; and
A, B, D and E are constants.

19. The system of claim 16, further comprising:

a third temperature sensor situated at a third location in the enclosure, which is spaced from the first location and the second location; and wherein:

the controller also receives a third temperature from the third temperature sensor;

the dynamic heat generating element causes at least in part the first temperature, the second temperature and/or the third temperature to change greater than the predetermined rate of X degrees Fahrenheit per second;

the controller determines a measure related to an ambient temperature outside of the enclosure based, at least in part, on the first temperature, the second temperature and the third temperature on greater than the predetermined rate of X degrees Fahrenheit per second of temperature change of the first temperature, the second temperature and/or the third temperature;

the measure is from an algorithm comprising an equation, $$T_A = (AT_1 BT_2 + CT_3 + Ew + D)/(A+B+C);$$

$T_A$ is ambient temperature;
$T_1$ is the first temperature;
$T_2$ is the second temperature;
$T_3$ is the third temperature;
E is a dynamic heat source factor;
w is a dynamic heat source level; and
A, B, C, D and E are constants.

* * * * *